United States Patent [19]

Power

[11] Patent Number: 5,020,688
[45] Date of Patent: Jun. 4, 1991

[54] HOT POPCORN MICROWAVE VENDING MACHINE

[76] Inventor: Patrick J. Power, 530 Governor's Dr., Winthrop, Mass. 02152

[21] Appl. No.: 358,874

[22] Filed: May 31, 1989

[51] Int. Cl.⁵ .................... A23L 1/18; G07F 11/10
[52] U.S. Cl. ................... 221/150 A; 99/323.7; 99/323.9
[58] Field of Search ............ 221/150 A, 150 HC; 99/323.6, 323.7, 323.9

[56] References Cited

U.S. PATENT DOCUMENTS

| | | | |
|---|---|---|---|
| 2,603,142 | 7/1952 | Miller | 99/323.6 |
| 2,950,024 | 8/1960 | Adler | 221/150 A X |
| 3,180,247 | 4/1965 | Hill | 221/150 A X |
| 3,653,541 | 4/1972 | Crum | 221/150 HC |
| 4,359,935 | 11/1982 | Murray | 99/357 X |
| 4,398,651 | 8/1983 | Kumpfer | 99/359 X |
| 4,428,280 | 1/1984 | Williams et al. | 99/356 |
| 4,513,879 | 4/1985 | Reiss | 221/150 A X |
| 4,848,591 | 7/1989 | Wada | 221/150 A X |

Primary Examiner—F. J. Bartuska
Attorney, Agent, or Firm—John M. Brandt

[57] ABSTRACT

The present invention relates to a vending machine designed to dispense one of a plurality of different flavors and/or types of popcorn. The device includes storage for the various types of popcorn, a chute system to convey popcorn to a microwave oven, and further conveying structure to convey the popped popcorn in its bag to a delivery chute. In the preferred embodiment, a pneumatic system is utilized to control the conveying of popcorn bags through the system.

1 Claim, 4 Drawing Sheets

HOT POPCORN MICROWAVE VENDING MACHINE

BACKGROUND OF THE INVENTION

The present invention relates to a hot popcorn vending machine. In the prior art, vending machines which cook and dispense food products are known. However, applicant is unaware of any such device which includes all of the features and aspects of the present invention.

The following prior art is known to applicant:

U.S. Pat. No. 4,398,651 to Kumpfer teaches the concept of a coin operated device including storage for food products, a microwave oven, and a dispenser. However, the specific configuration and manner of control of the present invention is nowhere taught or suggested by Kumpfer.

U.S. Pat. No. 4,359,935 to Murray discloses the concept of a food cooking and dispensing apparatus which is designed to convey the food to a position where it is cooked and thereafter to dispense the food. However, the conveying structure and dispensing structure of Murray are different from the teachings of the present invention.

U.S. Pat. No. 4,428,280 to Williams, et al. discloses the concept of a cooking apparatus including a hopper for storing raw or precooked foodstuffs, a metering device designed to weigh a predetermined quantity of the foodstuffs, and a vibratory conveyor designed to move the foodstuff from the hopper to a cooking area with further means for finally dispensing the cooked foodstuffs. The present invention includes details of conveying, cooking and dispensing structure nowhere taught or suggested by Williams, et al.

SUMMARY OF THE INVENTION

The present invention relates to a hot popcorn vending machine. The present invention includes the following interrelated aspects and features:

(a) In a first aspect, the inventive vending machine includes storage for a plurality of different kinds of popcorn with the popcorn being contained in individual bags designed and suitable for containing popcorn while it is being heated in a microwave oven.

(b) The inventive vending machine is coin operated and includes a control device which activates the internal workings thereof responsive to indication of receipt of the correct amount of money.

(c) A pneumatic system is utilized to control movement of popcorn bags from storage to the microwave oven included in the device and thereafter to a dispensing hopper.

(d) The pneumatic system includes a compressor which is activated responsive to sensing of receipt of coins of proper denomination and remains operable throughout each cycling of the machine.

Accordingly, it is a first object of the present invention to provide an improved hot popcorn vending machine.

It is a further object of the present invention to provide such a device wherein any one of a plurality of different flavors of popcorn may be heated and thereafter dispensed.

It is a yet further object of the present invention to provide such a device which utilizes pneumatic means for controlling movement of popcorn bags through a cycle.

These and other objects, aspects and features of the present invention will be better understood from the following detailed description of the preferred embodiment when read in conjunction with the appended drawing figures.

SPECIFIC DESCRIPTION OF THE PREFERRED EMBODIMENT

Figure 1:
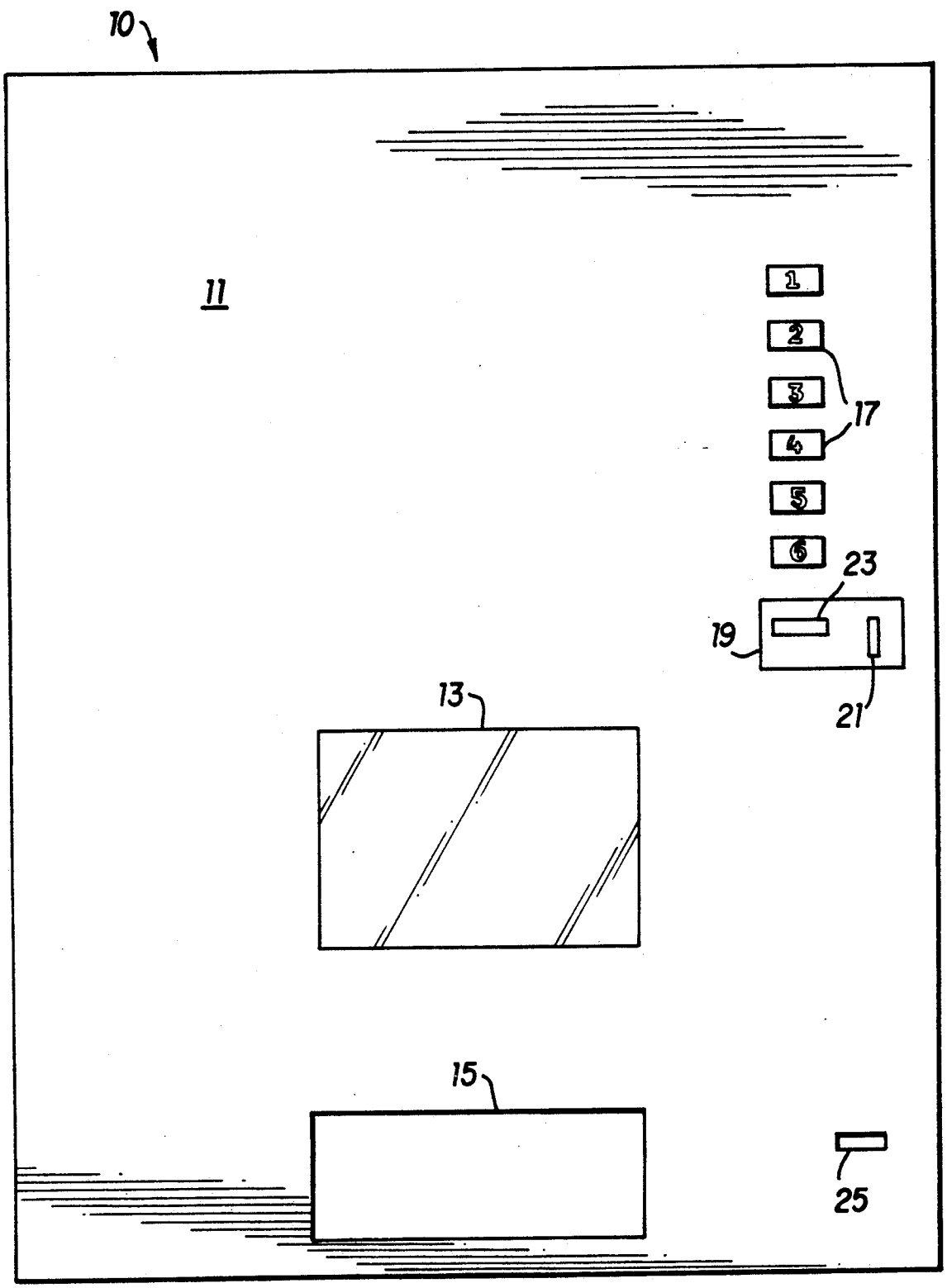
FIG. 1 shows a front view of the inventive vending machine.

With reference, first, to FIG. 1, it is seen that the inventive vending machine is generally designated by the reference numeral 10 and is seen to include a front wall 11 including a window 13 and a transparent pivotable door 15 for a purpose to be described in greater detail hereinafter.

With further reference to FIG. 1, it is seen that a plurality of buttons 17 are provided as is a coin receiving mechanism 19 including a coin slot 21 and a coin return pivoting lever 23. The exit of a coin return chute 25 is also shown.

Figure 2:
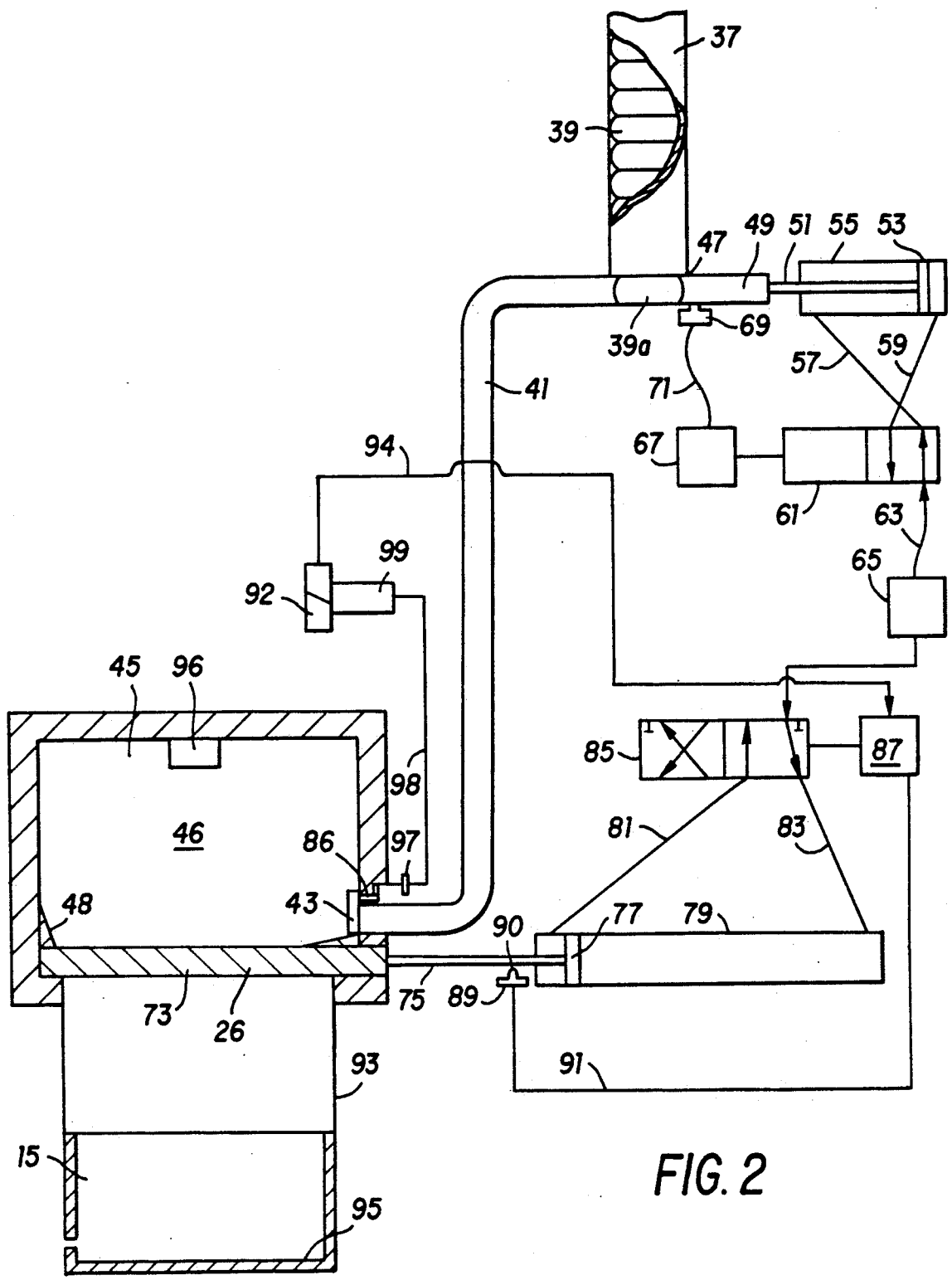
FIG. 2 shows a schematic representation of the internal workings of the inventive vending machine.
Figure 3:
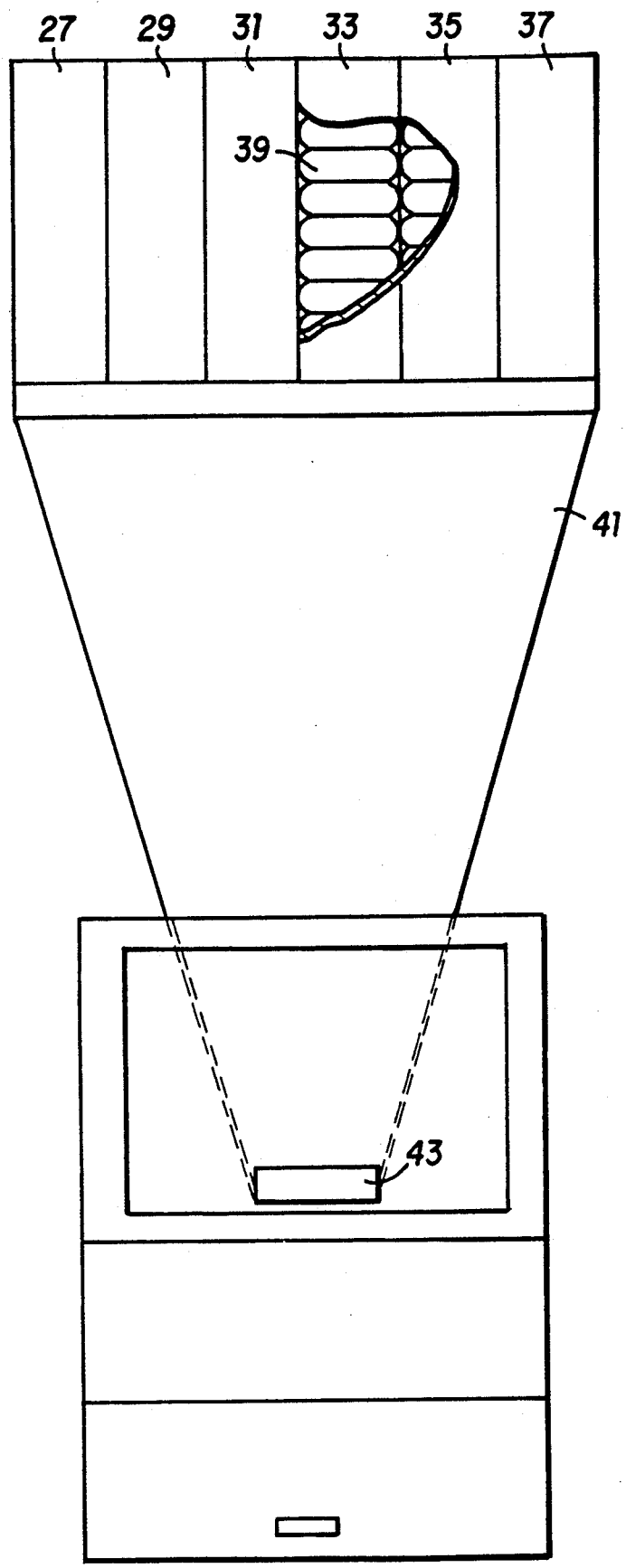
FIG. 3 shows a front view of certain portions of the structure shown in FIG. 2.
Figure 4:
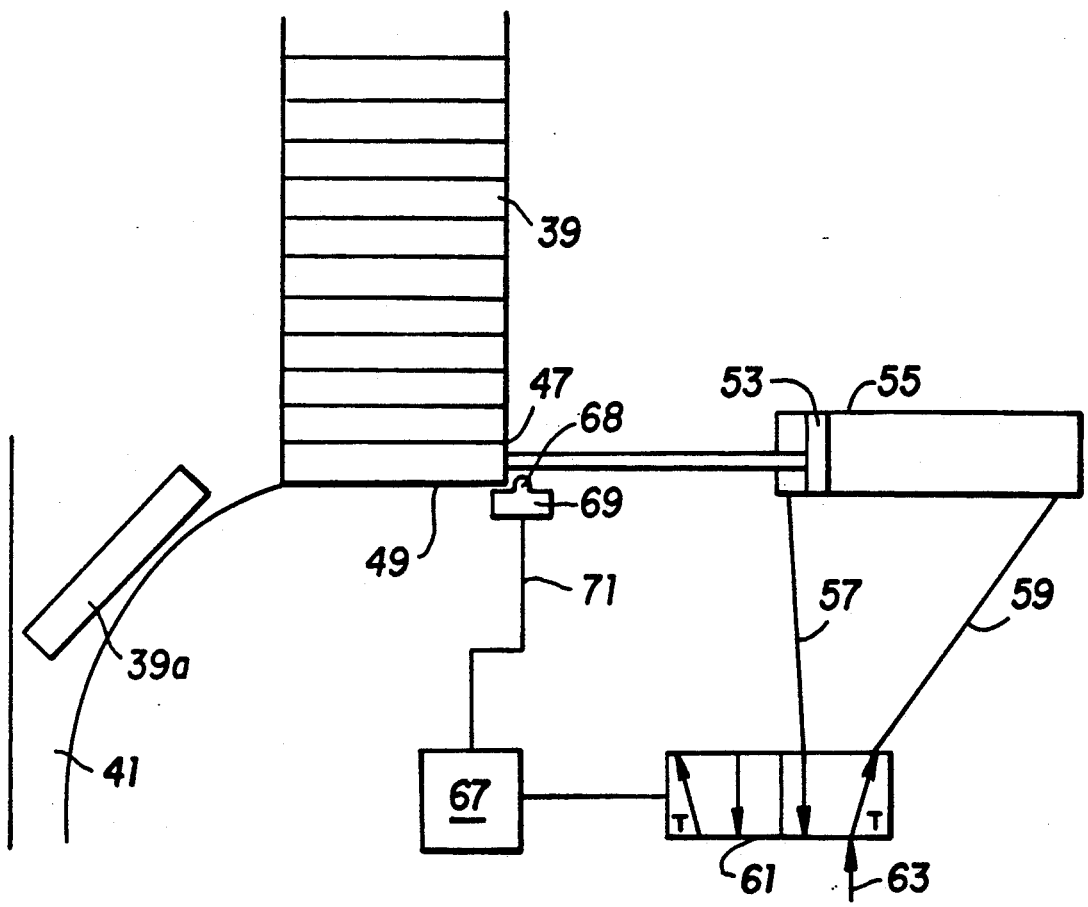
FIG. 4 shows a view of a portion of the structure shown in FIG. 2, but in a different operating configuration thereof.

With reference to FIGS. 2-4, the inner workings of the inventive machine 10 will be described. Firstly, FIG. 3 shows a plurality of stacks 27, 29, 31, 33, 35 and 37 of containers 39, each container 39 comprising, in the preferred embodiment, a bag with a premeasured amount of popcorn therein. In the preferred embodiment of the present invention, each of the above described stacks of bags 39 includes popcorn of a predetermined flavor, brand, consistency, etc. For example, one stack may include buttered popcorn, one stack may include popcorn with butter and salt, one stack may include popcorn with a flavor such as, for example, caramel, etc.

As further seen in FIG. 3, all of the stacks 27, 29, 31, 33, 35 and 37 of bags 39 are connected to a single delivery chute 41 which leads to a door 43 allowing entry of a popcorn bag 39 into the microwave oven 45.

With reference to FIG. 2, for purposes of explanation, a single stack 37 of popcorn bags 39 is shown. The stack 37 includes a bottom opening 47 through which the bottom-most bag 39a extends in alignment with a plunger device 49 connected to a piston rod 51 which is connected to a piston 53 slidably mounted in the cylinder 55. Passages 57, 59 connect the respective ends of the cylinder 55 with a four-port reversing valve 61 which is supplied with compressed air via a passageway 63 from compressor 65. As should be understood by those skilled in the art, the valve 61 includes one position as shown in FIG. 2 wherein compressed air will be conveyed through the passage 57 to move the piston 53 in the right-hand direction as shown in FIG. 2, and a second position wherein compressed air will be conveyed through the passage 59 to move the piston 53 in the left-hand direction in the Figure. When compressed air is being conveyed through one of the passages 57 or 59, the other of these passages conveys air from the back side of the cylinder back through an exhaust port in the valve 61. A control means 67 is provided to control movement of the valve 61 between its two positions, and the control means 67 is controlled by electrical impulses received from the switch 69 via the electrical conductor 71 in a manner to be described in greater detail hereinafter.

With further reference to FIG. 2, it is seen that the microwave oven 45 includes an internal cooking chamber 46 having a bottom opening 48 closed by a plunger 73 connected to a piston rod 75 and a piston 77 slidably mounted within a cylinder 79. Opposed ends of the cylinder 79 have passages 81, 83 connected thereto which fluidly connect to a further four-port reversing valve 85 which is controlled by control means 87 which operates responsive to receiving of signals from the switch 89 and the electrical conductor 91 in a manner to be described in greater detail hereinafter.

The cooking chamber 46 of the microwave oven 45 is visible through the window 13 seen in FIG. 1. Furthermore, when the plunger 73 is retracted as the inventive vending machine is operated, a popcorn bag 39, the contents of which has been cooked in the chamber 46, may drop through the chute 93 until landing on the bottom wall 95 thereof whereupon the door 15 may be pivoted to remove a cooked bag of popcorn.

With further reference to FIG. 2, it is seen that the pivoting door 43 is adjacent a switch 97 connected to a timing mechanism 99 by virtue of the electrical conductor 98. The timer mechanism 99 controls activation of the microwave power generator 96 in the chamber 46 for a predetermined amount of time, for example three to four minutes. At the end of the timing cycle, the timer 99 provides an electrical impulse to the sender 92, which impulse is transmitted via the electrical conductor 94 to the control mechanism 87 for the valve 85 so that the valve 85 may be moved to its position of orientation not shown in FIG. 2 wherein air pressure is provided in the line 81 to move the piston 77 to the right in the figure to allow opening of the plunger 26 to allow release of the cooked popcorn bag into the chute 93.

Now, the details of the present invention having been described in great detail, the intended mode of operation of the present invention will now be described.

When a person has inserted the proper coinage into the slot 21, as sensed by the device 19, the vending machine 10 will be placed in an operating condition, including activation of the air compressor 65. Thereafter, the user may push one of the buttons 17 depending upon which type of popcorn the person desires. Whichever button 17 is pushed, the corresponding control means 67 is activated to move the valve 61 to a position causing compressed air to flow through the passage 59 to move the piston 53 to the left in the view of FIG. 2 to cause the plunger 49 to push the lowermost bag 39a of popcorn into the chute 41 and thence by gravity to flow downwardly in the chute 41. While the bag 39a is moving down the chute 41 through the force of gravity, at the same time, the switch 69 has sensed that the plunger 49 has completely passed the switch 69 and, thereby, provides an electrical impulse via the electrical conductor 71 to the control means 67 which is operative to reverse the position of the valve 61 to allow compressed air to flow through the passage 57 to move the piston 53 back to the position shown in FIG. 2. Particular reference is made to FIG. 4, which shows the position of the plunger 49 as moving past the microswitch 69 to allow the plunger 68 thereof to move upwardly to cause the signal to be sent through the line 71.

With reference back to FIG. 2, the bag 39a of popcorn travels through the chute 41 and pivots open the door 43 allowing entry into the chamber 46. The door 43 serves three purposes. Firstly, it keeps the chamber 46 closed to prevent microwave energy from entering the chute 41. Secondly, it controls the velocity at which the popcorn bag enters the microwave cavity by virtue of the spring mounting means 86 which may be selectively adjusted to adjust the tension of the mounting means. Thirdly, movement of the door 43 activates the microswitch 97 to allow flow of electrical current through the electrical conductor 98 to activate the timer 99 which controls operation of the microwave power generator 96.

Under control of the timer 99, the microwave power generator 96 is activated for a predetermined period of time during which popcorn within the bag 39a is cooked. At the conclusion of the timing cycle, the timer 99 deactivates the microwave power generator 96 and via the controller 92 causes an electrical signal to be sent through the electrical conductor 94 to the control means 87 to move the valve 85 to a position wherein compressed air from the compressor 65 is caused to flow through the flow passage 81 to move the piston 77 in a left-hand direction in the view of FIG. 2 to cause the plunger 26 to open allowing release of the popcorn bag 39a into the chute 93, falling until engagement with the bottom wall 95, whereupon the door 15 may be opened to retrieve the cooked popcorn in its bag.

When the plunger 90 has moved to its open position as sensed by the switch 89, depression of the plunger 90 of the switch 89 by the plunger 26 causes electrical current to flow through the conductor 91 to the control means 87 to cause the valve 85 to be reversed to a position where compressed air flows through the passageway 83 to cause the piston 77 to move in the right-hand direction, as shown in FIG. 2, to move the plunger 26 to a position closing the opening 48.

In the view of FIG. 2, the valve 85 is in the position wherein compressed air will move the piston 77 in the left-hand direction in the figure.

After the entire cycle as described above has been completed, the compressor 65 is deactivated until such time as the next customer inserts the proper coinage in the slot 21.

As such, an invention has been described in terms of a preferred embodiment thereof which fulfills each and every one of the objects of the invention as set forth hereinabove and provides a new and improved vending machine of great utility in the vending machine field. Of course, various changes, modifications and alterations in the teachings of the present invention may be contemplated by those skilled in the art without departing from the intended spirit and scope of the present invention. As such, it is intended that the present invention only be limited by the terms of the appended claims.

I claim:
1. A hot popcorn vending machine comprising:
   a. a plurality of storage bins for holding stacks of bags of popcorn;
   b. a common chute to which each of said bins is connected;
   c. pneumatically operated plunger means for selectively pushing a single one of said bags into said chute;

d. a microwave cooking chamber connected to said chute;

e. sensing means for sensing entry of one of said bags into said chamber, said sensing means comprising a door connecting said chute and said chamber, and switch means associated with said door; said door operable by the impact of one of said bags;

f. timer means responsive to said switch for timing a cooking period;

g. dispensing means in said chamber comprising a pneumatically operated sliding door responsive to said timer means for releasing said bag from said machine at the conclusion of said cooking period.

* * * * *